United States Patent

Miyazaki et al.

[11] Patent Number: 5,815,232
[45] Date of Patent: Sep. 29, 1998

[54] COLOR LIQUID CRYSTAL DISPLAY APPARATUS

[75] Inventors: Daisuke Miyazaki; Shoichi Kurauchi; Hitoshi Hatoh; Takeshi Yamamoto; Teruyuki Midorikawa, all of Kanagawa-ken, Japan

[73] Assignee: Kabushiki Kaisha Toshiba, Kanagawa-ken, Japan

[21] Appl. No.: 698,406

[22] Filed: Aug. 15, 1996

[30] Foreign Application Priority Data

Aug. 18, 1995 [JP] Japan .................................. 7-210320
Sep. 6, 1995 [JP] Japan .................................. 7-228967

[51] Int. Cl.$^6$ ........................ G02F 1/1339; G02F 1/1335
[52] U.S. Cl. ........................... 349/155; 349/106; 349/157
[58] Field of Search ................................... 349/155, 157, 349/106

[56] References Cited

U.S. PATENT DOCUMENTS 4,422,731 12/1983 Drognet et al. ......................... 349/155
5,556,670 9/1996 Mihara et al. ......................... 349/155

FOREIGN PATENT DOCUMENTS 56-140324 11/1981 Japan .
60-164721 8/1985 Japan .................................. 349/155
62-280721 12/1987 Japan .................................. 349/155
4-93924 3/1992 Japan .................................. 349/155
4-93927 3/1992 Japan .
5-196946 8/1993 Japan .
2576583 7/1996 Japan .

Primary Examiner—William L. Sikes
Assistant Examiner—Tiep H. Nguyen
Attorney, Agent, or Firm—Finnegan, Henderson, Farabow, Garrett & Dunner, L.L.P.

[57] ABSTRACT

A color filter substrate has a substrate structure, spacers which include a first spacer layer and a plurality of second spacer layers. Each of the second spacer layers has a sectional plane which is substantially parallel to the substrate structure. And the sectional plane has a entire projective area of the first spacer layer therein and an elongated portion from the projective area, so that an area of effective thickness of the spacer to maintain the gap between two substrates depends on an area of a smaller of the first and second surfaces of the first spacer layer. In other words, the outline of the first spacer layer is located so as to be entirely included within the outline of these second spacer layers. If the central axis of the first spacer layer is shifted from that of the second spacer layers in the manufacturing process of the liquid crystal display apparatus, misalignment between first and second spacer layers occurs. The degree of the misalignment depends on the accuracy of the photo-etching technique. On account of the portion, above misalignment is absorbed and the first spacer layer is entirely located on the second spacer layers. In this occasion, the effective thickness of the spacer is established over the whole projective area of the first spacer layer on the substrate, Therefore, regardless of the position within the liquid crystal display apparatus panel or the production lot, the gap uniformity between two substrates is gained. An island shape spacer is positioned at the liquid crystal injection area, so that the gap between the two substrates at the liquid crystal injection area is uniform.

19 Claims, 12 Drawing Sheets

COLOR LIQUID CRYSTAL DISPLAY APPARATUS

BACKGROUND OF THE INVENTION

This invention relates to a color filter substrate and a color liquid crystal display apparatus. This invention is useful for a color picture display apparatus for, for example a television receiver set, a monitor in a video-tape recorder, a view finder of a video camera or a display apparatus of a computer terminal machine.

In FIG. 18, a color liquid crystal display apparatus 20 includes a color filter substrate 10 and an opposite electrode substrate 50 with a liquid crystal layer 7 disposed between the two substrates. An inner surface of the color filter substrate 10 has an opaque layer 4, color layers 2 (i.e., 2R, 2G, 2B), an electrode 5 made of, for instance, ITO (Indium Tin Oxide), and an alignment film 14, usually formed of an organic material such as polyimide. Color ink layers 2, for instance, are composed of three colors, red (R) 2R, green (G) 2G and blue (B) 2B. The opaque layer 4 has a matrix shape and color ink layers 2 are disposed on open areas of the opaque layer 4. Between the two substrates 10 and 50, spacers 3 are disposed to maintain the gap between two substrates. These spacers 3 include a plurality of spacer ink layers, 3R, 3G and 3B, which are stacked. The spacer ink layers are formed during the process of forming color ink layers 2.

The two substrates 10 and 50 are attached to each other in a peripheral portion exclusive of a liquid crystal injection area, by a seal member.

An island shape spacer is disposed at a liquid crystal injection area. This island shape spacer is made of the same material as the seal member and is coated by a nozzle which dispenses the material.

In the liquid crystal display apparatus, as shown in FIG. 19 when a misalignment of the spacer layers, 3R, 3G and 3B, of the spacer 3 occurs during the spacer forming process, an area of effective thickness of the spacer is the maximum aligned area of the spacer layers and the gap of two substrates may be varied. Especially, when the substrate is curved, the degree of the misalignment tends to differ relative to the position on the substrate. In addition, when the degree of the misalignment varies relative to each production lot, the gap of two substrates is not uniform relative to each production lot. When the gap of two substrates is not uniform, it is difficult to produce a good display.

It is also difficult to maintain the gap of the two substrates at the liquid crystal injection area. Because the island shape spacer is made of the same seal material and coated by means of using a nozzle, the gap of the two substrates may not be uniform at the liquid crystal injection area, so that it is difficult to produce a good display.

SUMMARY OF THE INVENTION

Accordingly, the present invention is directed to a color filter substrate that substantially obviates one or more of the problems due to limitations and disadvantages of the related art.

In accordance with the present invention, the foregoing object is achieved by providing a color filter substrate comprising a substrate structure, a plurality of color layers disposed on said substrate structure, and a plurality of spacers, each of the spacers including a first spacer layer and a plurality of second spacer layers, one of the first and second spacer layers disposed on the substrate structure, wherein each the first and second spacer layer has a first surface on a substrate structure side and a second surface opposite to said first surface, for at least one of the first or second spacer layers the second surface is equal to or smaller in size than the first surface, each of said second spacer layers has a sectional plane which is substantially parallel to the substrate structure, and the sectional plane has a entire projective area of said first spacer layer therein and an elongated portion from the projective area.

In accordance with another aspect of the present invention, the foregoing object is achieved by providing a color liquid crystal display apparatus comprising a first substrate structure having a first electrode, a second substrate structure having a second electrode, a liquid crystal layer disposed between the first substrate structure and the second substrate structure, a plurality of color layers disposed on a selected of the first and second substrate structures and a plurality of spacers, each of the spacers including a first spacer layer and a plurality of second spacer layers, one of the first spacer layers and the second spacer layers disposed on the second substrate structure, wherein each the first and second spacer layer has a first surface on a substrate structure side and a second surface opposite to said first surface, for at least one of the first or second spacer layers the second surface is equal to or smaller in size than the first surface, each of said second spacer layers has a sectional plane which is substantially parallel to the substrate structure, and the sectional plane has a entire projective area of said first spacer layer therein and an elongated portion from the projective area.

In these invention, in other words, the area of these second spacer layers is larger than that of the first spacer layer, and the outline of the first spacer layer is located so as to be entirely included within the outline of these second spacer layers. If the central axis of the first spacer layer is shifted from that of the second spacer layers in the manufacturing process of the liquid crystal display apparatus, misalignment between first and second spacer layers occurs. The degree of the misalignment depends on the accuracy of the photo-etching technique. In these invention, each of the second layers are larger than the first spacer layer in size, so that the second spacer layers have a portion besides the projective area of the first spacer layer therein. On account of the portion, above misalignment is absorbed and the first spacer layer is entirely located on the second spacer layers. In this occasion, the effective thickness of the spacer is established over the whole projective area of the first spacer layer on the substrate, Therefore, regardless of the position within the liquid crystal display apparatus panel or the production lot, the gap uniformity between two substrates is gained.

In accordance with another aspect of the present invention, the foregoing object is achieved by providing a color filter substrate comprising a substrate structure, a plurality of color layers disposed on said substrate structure, a plurality of spacers, each of the spacers including a first spacer layer and a second spacer layer, the first and second spacer layers being stacked and one of the first and second spacer layers disposed on the substrate structure, wherein each the first and second spacer layer has a first surface on a substrate structure side and a second surface opposite to the first surface, the second spacer layer has a sectional plane which is substantially parallel to said substrate structure, and the sectional plane has a entire projective area of the first spacer layer therein and an elongated portion from the projective area.

In accordance with another aspect of the present invention, the foregoing object is achieved by providing a color liquid crystal display apparatus comprising a first substrate structure having a first electrode, a second substrate structure having a second electrode, a liquid crystal layer disposed between the first substrate structure and the second substrate structure, a plurality of color layers disposed on a selected one of the first and second substrate structures, a plurality of spacers, each of the spacers including a first spacer layer and a second spacer layer, the first and second spacer layers being stacked and one of the first and second spacer layers disposed on the selected substrate structure, wherein each the first and second spacer layer has a first surface on a substrate structure side and a second surface opposite to the first surface, the second spacer layer has a sectional plane which is substantially parallel to said substrate structure, and the sectional plane has a entire projective area of the first spacer layer therein and an elongated portion from the projective area.

In these invention, In other words, the area of the second spacer layer is larger than that of the first spacer layer, and the outline of the first spacer layer is located so as to be entirely included within the outline of the second spacer layer. If the central axis of the first spacer layer is shifted from that of the second spacer layer in the manufacturing process of the liquid crystal display apparatus, misalignment between first and second spacer layer occurs. The degree of the misalignment depends on the accuracy of the photo-etching technique. In these invention, the second layer are larger than the first spacer layer in size, so that the second spacer layer have a portion besides the projective area of the first spacer layer therein. On account of the portion, above misalignment is absorbed and the first spacer layer is entirely located on the second spacer layer. In this occasion, the effective thickness of the spacer is established over the whole projective area of the first spacer layer on the substrate, Therefore, regardless of the position within the liquid crystal display apparatus panel or the production lot, the gap uniformity between two substrates is gained.

In accordance with another aspect of the present invention, the foregoing object is achieved by providing a color liquid crystal display apparatus comprising a first substrate structure having a first electrode, a second substrate structure having a second electrode, a liquid crystal layer disposed between the first substrate structure and the second substrate-structure, a plurality of color layers disposed on a selected one of the first and second substrate structures, each the color layer positioned in an effective pixel area, a plurality of spacers, each of the spacers including a plurality of spacer layers, said plurality of spacer layers being stacked and one of the first and second spacer layers being disposed on the selected substrate and a seal area disposed on a peripheral portion of the selected substrate exclusive of a liquid crystal injection area, wherein one of the plurality of spacers is positioned near the liquid crystal injection area.

It is to be understood that both the foregoing general description and the following detailed description are exemplary and explanatory and are intended to provide further explanation of the invention as claimed.

The accompanying drawings are included to provide a further understanding of the invention and together with the description serve to explain the principles of the invention.

BRIEF DESCRIPTION OF THE DRAWINGS

The nature of this invention, as well as other objects and advantages thereof, will be readily apparent from consideration of the following specification relating to an annexed drawing in which.

DETAILED DESCRIPTION OF THE PREFERRED EMBODIMENT

An embodiment of this invention, for example for an active matrix liquid crystal display apparatus, will now be described with reference to FIGS. 1 to 8.

First, a structure of the liquid crystal display apparatus is described as follows.

Figure 1:
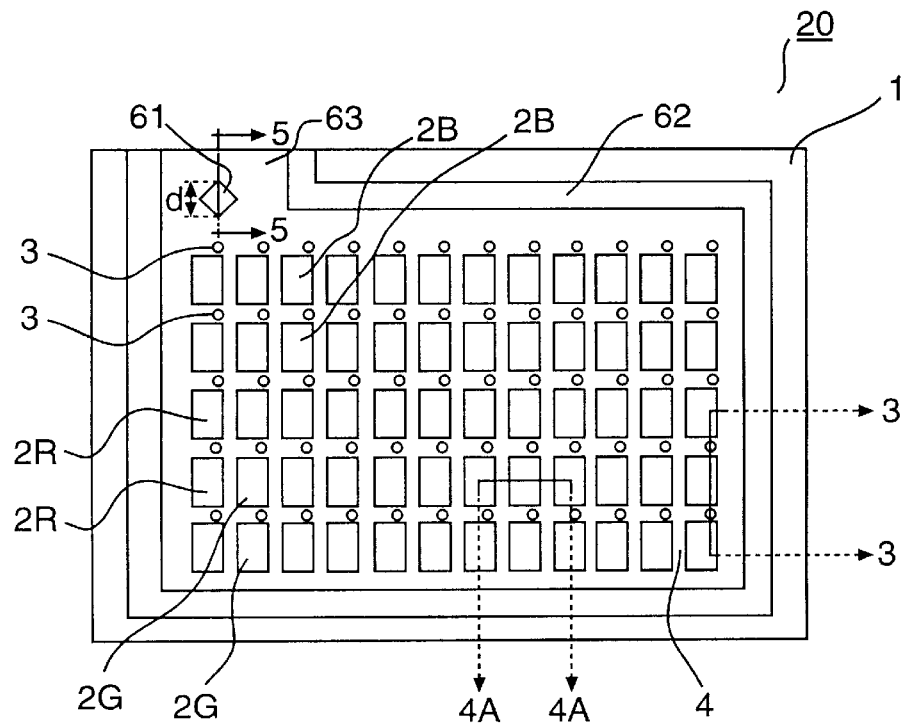
FIG. 1 is a plan view of a color liquid crystal display apparatus according to an embodiment of the present invention.
Figure 3:
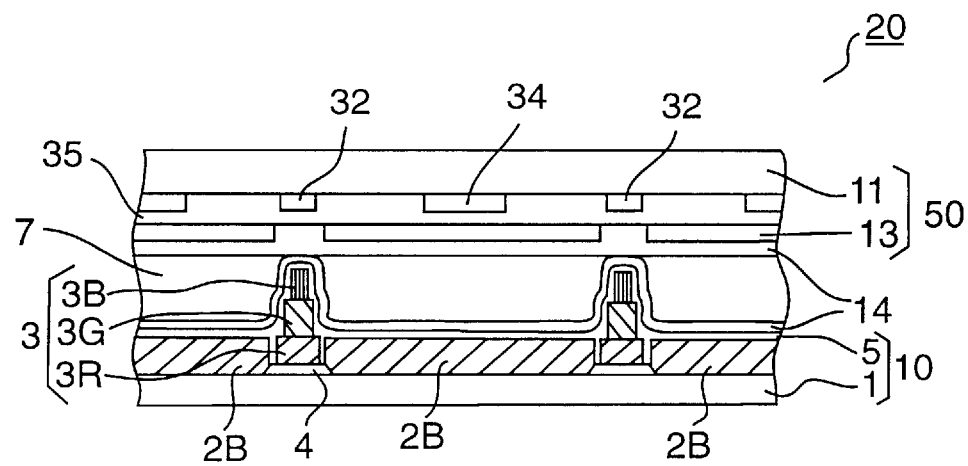
FIG. 3 is a sectional view taken on line A—A of FIGS. 1 and 2.

In FIGS. 1 and 3, the liquid crystal display apparatus 20 includes a color filter substrate 10 and an opposite electrode substrate 50 with a liquid crystal layer 7 disposed between the two substrates. In FIG. 1, the two substrates 10 and 50 are attached to each other along a peripheral portion 62, exclusive of a liquid crystal injection area 63, by seal material. The liquid crystal layer 7 is formed by injecting liquid crystal materials into the liquid injection area 63.

Figure 2:
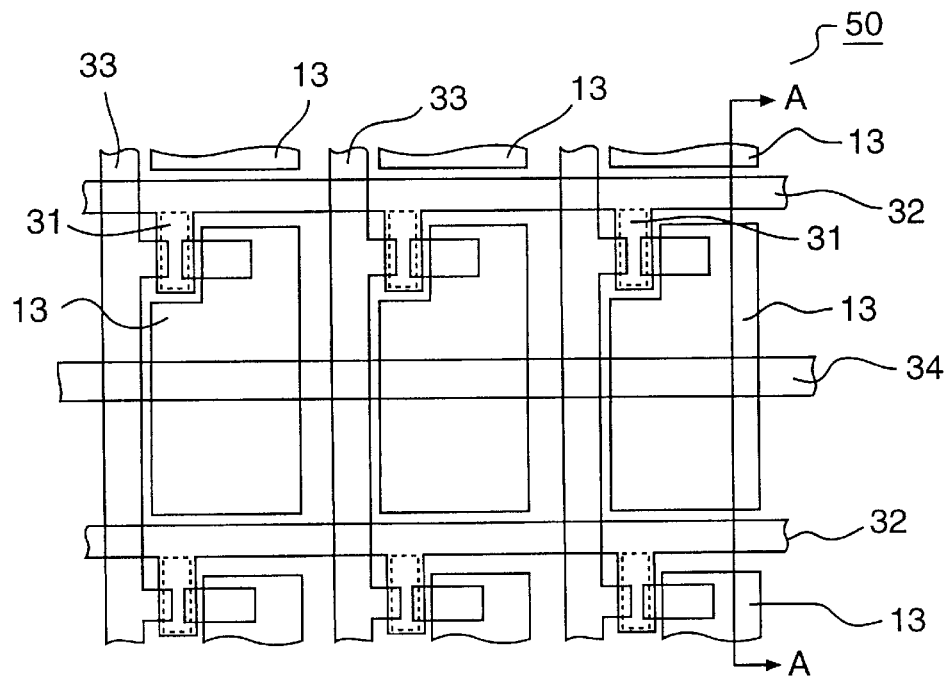
FIG. 2 is a plan view of an opposite electrode substrate of a color liquid crystal display apparatus according to an embodiment of the present invention.

In FIGS. 2 and 3, the opposite electrode substrate 50 comprises a first substrate structure 11, a plurality of gate lines 32 disposed on the first substrate structure 11, a plurality of signal lines 33 disposed so as to cross the gate lines 32, a plurality of transistors 31 coupled to the gate lines 32 and the signal lines 33, a plurality of pixel electrodes 13 coupled to the transistors 31 and a plurality of storage capacitor lines 34 coupled to the pixel electrode 13. Subsequently an alignment film 14, for example an organic material such as polyimide, is formed above the first substrate structure 11.

In FIGS. 1 and 3, the color filter substrate 10 comprises a second substrate structure 1 and a plurality of color layers 2 which have a stripe shape. The stripe shape of the color layer is not limited. The color layers are positioned at the least area corresponded to the pixel electrode. For example when the color layers have approximate size of the pixel electrode, the color layers includes three colors, red (R) 2R, green (G) 2G and blue (B) 2B which are stacked on the second substrate structure 1. Each color layer 2 is positioned at an effective pixel area and is positioned in correspondence with a different one of the pixel electrodes. An opaque layer 4 has a matrix shape and is disposed between the neighboring effective pixel areas. A plurality of spacers 3 are positioned within an area of the opaque layer 4 surface to maintain the gap between the two substrates 10 and 50. Subsequently an opposite electrode 5 made of, for example, Indium Tin Oxide, and the alignment film 14, usually an organic material such as polyimide is formed above the substrate. Herein, an effective pixel area means a light-transmission area which is not overlapped by the opaque layer 4.

Figure 4A:
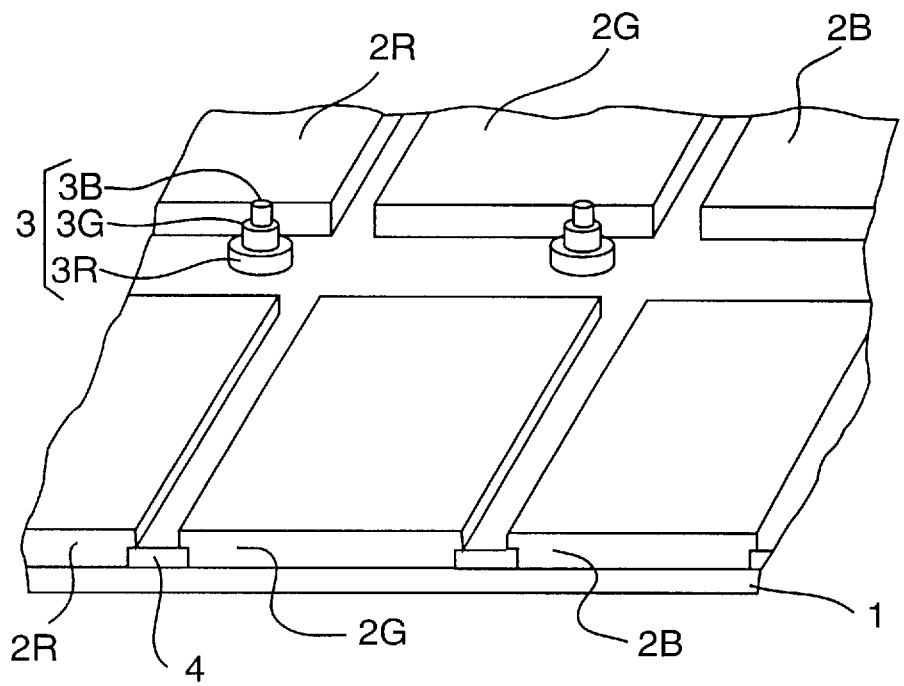
FIG. 4(a) is a perspective view taken on line B—B of FIG. 1.
Figure 4B:
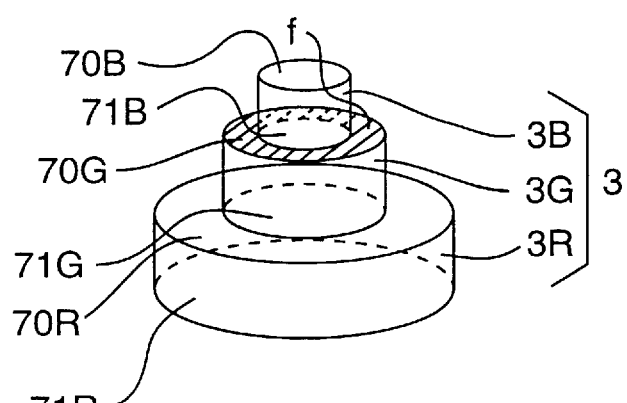
FIG. 4(b) is a perspective view of a spacer shown in FIG. 1.

In FIG. 4(a), the spacers 3 include a first spacer layer 3B and a plurality of second spacer layers, 3R and 3G, which are stacked. The first spacer layer 3B and the plurality of second spacer layers, 3R and 3G, are formed during a formation process of the color layers 2 which are 2R, 2G and 2B. The color layers 2 are positioned at a distance from the spacers 3 and the spacers have an island shape. In FIG. 4(b), each spacer layer, 3R, 3G and 3B, has a first surface, 71R, 71G and 71B, on a substrate structure side and a second surface, 70R, 70G and 70B, opposite to the first surface for at least one of the first or the plurality of second spacer layers. The area of the second surface 70R, 70G, 70B is nearly equal to the first surface 71R, 71G, 71B, respectively, so that each spacer layer is a cylindrical shape.

The second spacer layers, 3G and 3R has a sectional plane which is substantially parallel to the substrate structure 1. And the sectional plane has a entire projective area of the first spacer layer 3B therein and an elongated portion, for example an area "f" drawn by oblique lines, from the projective area.

An alignment of liquid crystal molecules of the liquid crystal layer is determined by the alignment film 14. Due to the presence of spacers, an alignment defect of liquid crystal molecules may occur near spacers.

Accordingly, the spacers are disposed between the neighboring effective pixel areas, that is, in noneffective pixel areas, so that any alignment defects of liquid crystal molecules occurring near spacers are screened.

Figure 5:
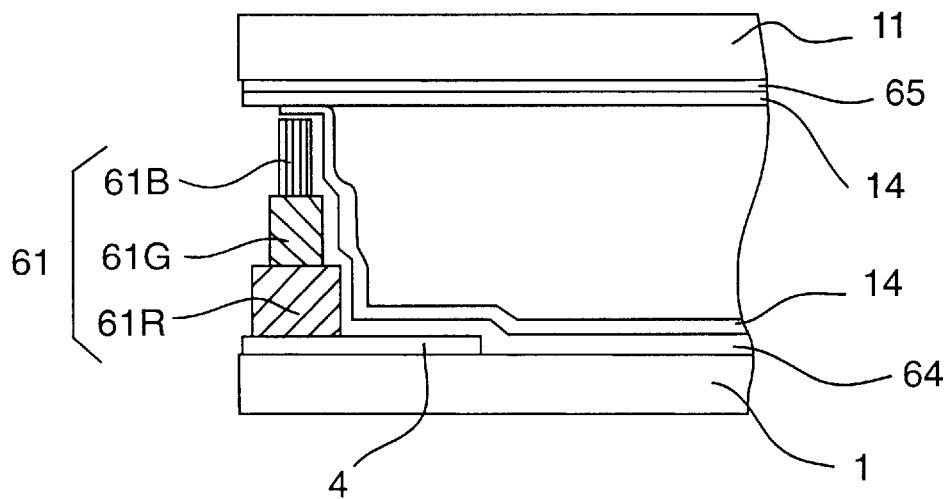
FIG. 5 is a sectional view taken on line C—C of FIG. 1.

In FIGS. 1 and 5, an island shape spacer 61 is positioned at the liquid crystal injection area 63. The island shape spacer 61 includes a plurality of spacer layers, 61R, 61G and 61B, formed during the formation process of color layers 2. The opaque layer 4 is disposed under the island shape spacer 61. Electrode pattern 64 and the alignment film 14 formed on the substrate structure 1 cover the island shape spacer 61. Electrode pattern 65 and the alignment film 14 formed on the substrate structure 11 are disposed at the area corresponded to the island spacer 61. Both alignment films 14 formed on the substrates 1 and 11 cover the area corresponding to the island spacer 61. The island shape spacer 61 is formed during the formation process of the spacers in the effective pixel area and the alignment films 14 and the electrode patterns 64 and 65 are disposed at the area corresponding to the island spacer, so that the gap between the two substrates at the liquid crystal injection area is nearly equal to the gap between the two substrates at the effective pixel area. The opaque layer disposed at the liquid crystal injection area has a function of blocking light.

Steps by which the color filter substrate has been formed are described as follows.

Figure 6A:
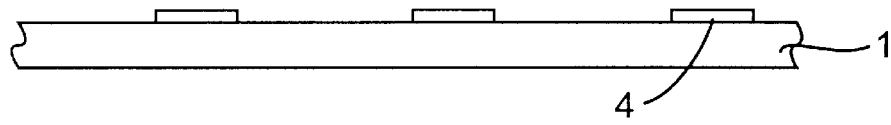
FIGS. 6(a) to 6(e) are sectional views showing steps for forming the color filter substrate of the color liquid crystal display apparatus according to the embodiment shown in FIG. 1.

In FIG. 6(a), an acrylic resin including carbon black was coated by a spin coater on a soda glass substrate structure as the substrate structure 1. The substrate was preheated at 90° C. for ten minutes, and then irradiated from the acrylic resin coated side by a lamp at 300 mj/cm$^2$ using a photomask. Next, the acrylic resin was developed with alkaline developer of pH11.5, and then baked at 200° C. for one hour, leaving opaque layers 4 having a thickness of 2.00 μm on the substrate structure 1.

Figure 6B:
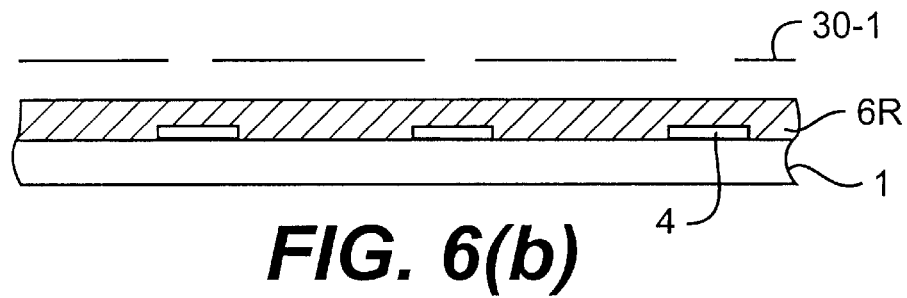
Figure 6C:
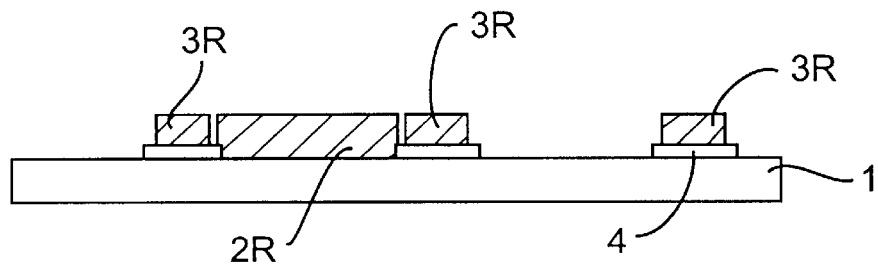
Figure 8:
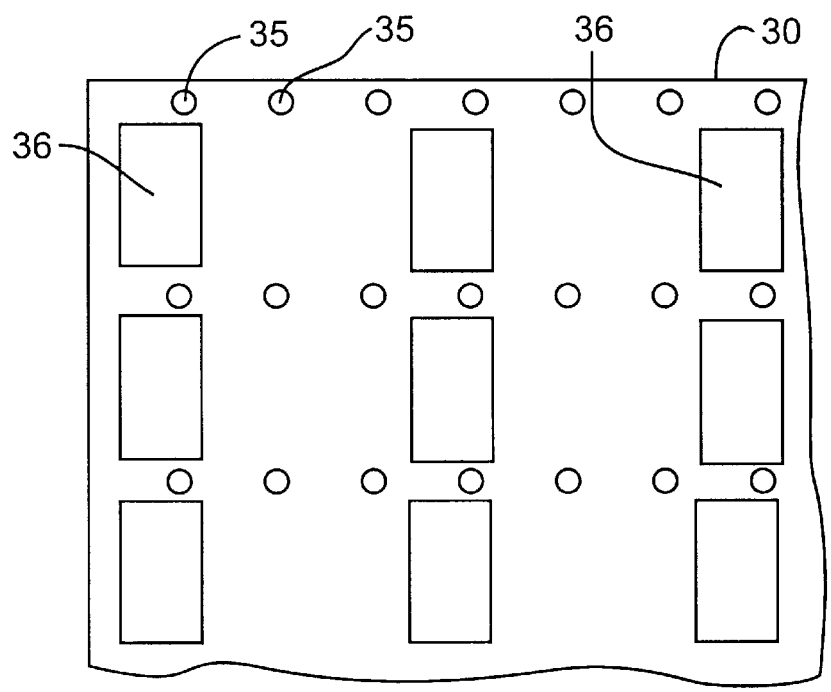
FIG. 8 is a a plan view of a photomask for forming the color filter substrate of the color liquid crystal display apparatus according to the embodiment shown in FIG. 1.

Next, in FIG. 6(b), a red resist was coated by a spin coater on the opaque layer 4 formed on substrate structure 1.Then the red resist coated substrate structure was preheated, and then irradiated from the red resin coated side by a lamp at 100 mj/cm$^2$ through a first photomask 30-1. As shown in FIG. 8 this first photomask 30-1 has holes for color layers pattern 36, circular shape holes for spacer layers pattern 35 and an island shape hole for the spacer near the liquid crystal injection area(not shown). Next, in FIG. 6c, the red resist was developed with alkaline developer of pH11.5, and then baked at 200° C. for one hour, leaving red color layers 2R, red spacer layers 3R and the red island shape spacer layer 61R (not shown) which are 2.0 μm in thickness.

Figure 6D:
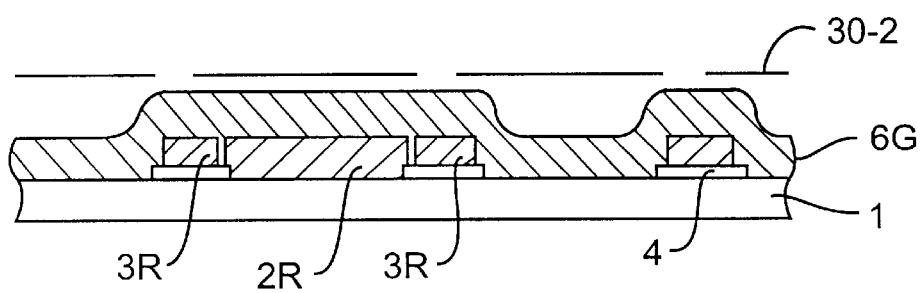
Figure 6E:
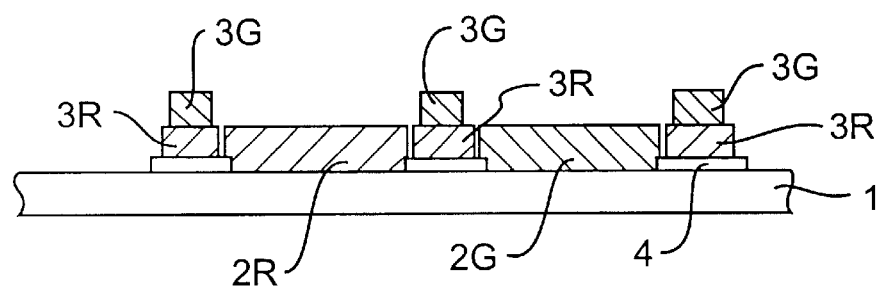
Figure 7:
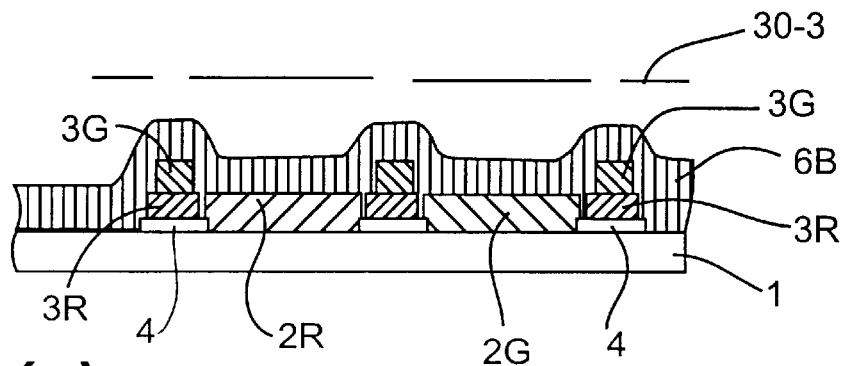
FIGS. 7(a) and 7(b) are sectional views showing steps for forming the color filter subsequent to the steps shown in FIGS. 6(a) to 6(e)
Figure 7:
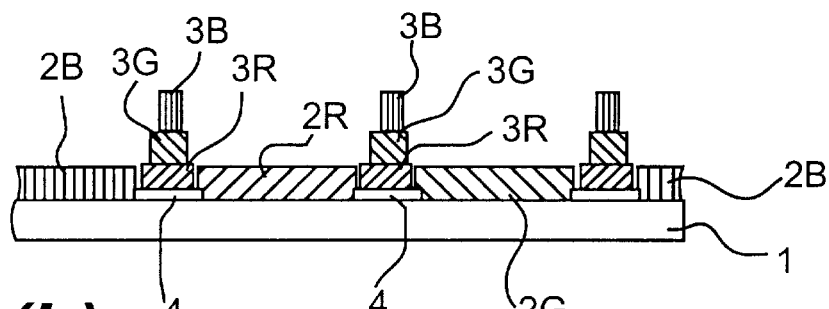

Next, in FIG. 6(d), a green resist was coated by a spin coater on the substrate structure 1. The green resist coated substrate structure was preheated, and then irradiated using a second photomask 30-2 in the same irradiation condition of layers 2R and spacer layers 3R. This second photomask 30-2 has the same shape holes as the first photomask but with a difference noted below. Next, in FIG. 6e, the green resist was developed in the same development condition of layers 2R and spacer layers 3R. As a result, green color layers 2G, green spacer layers 3G and the green island shape spacer layer 61G (not shown) which were 2.0 μm in thickness were formed. The size of holes for spacer layers pattern 35 of the second photomask 30-2 was smaller than the size of holes for spacer layers pattern 35 of the first photomask 30-1.

Next, in FIG. 7(a), a blue resist was coated by a spin coater on the substrate structure 1. The blue resist coated substrate structure was preheated, and then irradiated using a third photomask 30-3 in the same irradiation condition of layers 2R and spacer layers 3R. This third photomask had the same shape holes as the first photomask but with a difference noted below. Next, in FIG. 7(b), the blue resist was developed in the same development condition of layers 2R and spacer layers 3R. As a result, blue color layers 2B, blue spacer layers 3B and the blue island shape spacer layer 61B (not shown) which were 2.0 μm in thickness were formed. The size of holes for spacer layers pattern 35 of the third photomask 30-3 was smaller than the size of holes for spacer layers pattern 35 of the first photomask 30-1 and the second photomask 30-2.

An alignment precision for setting an exposure apparatus is, for example ±2 μm, so that a diameter of the cylindrical shape red spacer layers 3R was designed to be 20 μm, a diameter of the cylindrical shape green spacer layers 3G was designed to be 16 μm and the diameter of the cylindrical shape blue spacer layers 3B was designed to be 12 μm.

Accordingly in order to stack the spacer layer, the hole size of the photomask for each spacer layer was small, so that in FIG. 4(b), the sectional plane of each of the second spacer layers has a entire projective area of the first spacer layer 3B therein and an elongated portion from the projective area. Thus, even if a misalignment of the photomask occurs, an area of effective thickness of a spacer is an area of the first surface 70B of the first spacer layer 3B and the gap between the two substrates is uniform. Also, even if the substrate is curved, the gap between the two substrates is uniform and it is easy to produce a good display.

Next, after forming color layers and spacers, the electrode 5 made of Indium Tin Oxide and the alignment film 14 made of polyimide were formed.

In the above described fabrication process, the spacer includes three spacer layers, however the spacer can include more than or less than three spacer layers according to a required thickness of the gap between the two substrates. In addition, the spacers are positioned within an area of the opaque layer surface, so that alignment defects of liquid crystal molecules that occurs due to the existence of spacers are screened by the opaque layer. Furthermore the opaque effect is improved compared to the case of cutting off the light in the absence of the opaque layer.

Then, in FIG. 1, the opposite electrode substrate and the color filter substrate 10 were attached to each other along the peripheral portion 62 of the substrate, exclusive of the liquid crystal injection area 63, by seal material. The liquid crystal layer 7 was formed by injecting liquid crystal materials into the liquid injection area 63 and the liquid crystal injection area 63 was sealed by resin. The liquid crystal display apparatus was thereby formed.

When two substrates are attached, the spacer layers which are the most distant from the color filter substrate are respectively disposed within the nearest electrode from the first substrate selected from the gate lines, the signal lines and the storage capacitor lines. The gate lines, the signal lines and the storage capacitor lines are positioned at the noneffective pixel area, so that any alignment defects of liquid crystal molecules occurring near spacers are screened. In the illustrated embodiment, the nearest electrode is the gate lines. In FIG. 3, because an insulating layer 35 is formed above the gate lines 32, a short-circuit between the gate lines 32 and the electrode 5 formed on the spacer 3 is prevented. The distance of the nearest electrode lines from the first substrate and the electrode 5 is farther than the distance of other electrode lines and the electrode 5. So if the spacer is positioned at the nearest electrode lines from the first substrate, there is little possible for short-circuit between the electrode lines and the electrode 5 in comparison with other electrode lines.

In another embodiment, the most distant spacer layers from the color filter substrate can be positioned at the storage capacitor line 34. In this occasion, if there is the case that the insulating layer between the capacitor lines 34 and the electrode 5 has pinhole defects, a short-circuit between the capacitor lines 34 and the electrode 5 will occur. However, since the input voltage level of the capacitor lines 34 and the electrode 5 are the same, the operation of the line 34 and electrode 5 will not be affected by the short-circuit defect.

In addition, with respect to attachment of two substrates, when misalignment occur, the spacer which is supposed to be positioned at the gate lines may instead be positioned at the pixel electrode and then short-circuit between the pixel electrode and the electrode formed on the spacer. In this regard, it is preferable that the diameter of the second surface of the spacer layer most distant from the color filter substrate is smaller than the other spacer layers. With the diameter of the spacer layers most distant from the color filter substrate supported, a wide alignment margin is gained during the attachment of two substrates and the possibility of short-circuiting between the pixel electrode and the electrode formed on the spacer is prevented.

Also, when one island shape spacer positioned at the liquid crystal injection area is formed, it is preferable that the spacer is positioned at the center of the liquid crystal injection area. As a result, the gap between the two substrates relative to the position of island shape spacer on the substrate is uniform. When a plurality of island shape spacers is formed, it is preferable that the spacers are formed at regular intervals at the liquid crystal injection area, because the gap between two substrates relative to the position on the substrate is uniform. The island shape spacer at the liquid crystal injection area can be designed larger than the spacers in the effective pixel area, so that misalignment during the island shape spacer forming process can be ignored. As a result, the shape of each spacer layer at the liquid crystal injection may be the same.

In this embodiment, the spacer layers are formed during a formation process of the color layers, although spacer layers and color layers can be formed during separate formation process. However, in this embodiment, spacer layers are formed during a formation process of the color layers, so that the process of forming the color filter substrate can be shortened. Also, the shape of the photomask for the spacers and the island spacer layer can have a varied shape.

Another embodiment of the present invention will be described below.

In this embodiment, the invention is applied to a simple matrix type liquid crystal display apparatus. This apparatus has an oppositing electrode substrate and color filter substrate.

The electrode substrate has a substrate structure, a plurality of stripe shape electrodes formed on the substrate structure and an alignment layer formed on the substrate.

The color filter substrate has a substrate structure, a plurality of color layers formed on the substrate and a plurality of spacer layers on the substrate structure. A plurality of stripe shape electrodes are formed so as to cross the stripe shape color layer on the substrate structure and the alignment layer is formed on the substrate structure.

These two substrates are positioned to cross each stripe shape electrodes formed on each substrate. It is preferable that the spacers are positioned in areas exclusive of the electrode, so that a short-circuit does not occur between an electrode on the electrode substrate and an electrode on the color filter substrate.

The above-described liquid crystal display apparatus makes it possible to achieve the production of display that are stable in quality.

Furthermore embodiments of the present invention will be described below.

In the above-described embodiment, in a sectional view, with respect to the relative diameters in the stack of spacer layers, the diameter of the spacer layer is gradually decreased. However this shaping of the spacer layers is not so limited. When the spacer includes three more spacer layers, one of the spacer layers is the first layer and the other spacer layers are the plurality of second spacer layers. Each the first and second spacer layer has a first surface on a substrate structure side and a second surface opposite to said first surface. For at least one of the first or second spacer layers the second surface is equal to or smaller in size than the first surface. Each of the second spacer layers has a sectional plane which is substantially parallel to the substrate structure, and the sectional plane has a entire projective area of the first spacer layer therein and an elongated portion from the projective area.

In other words, the area of these second spacer layers is larger than that of the first spacer layer, and the outline of the first spacer layer is located so as to be entirely included within the outline of these second spacer layers. If the central axis of the first spacer layer is shifted from that of the second spacer layers in the manufacturing process of the liquid crystal display apparatus, misalignment between first and second spacer layers occurs. The degree of the misalignment depends on the accuracy of the photo-etching technique. In this embodiment, each of the second layers is larger than the first spacer layer in size, so that the second spacer layers have a portion extending beyond the projected area of the first spacer layer therein. On account of the extended portion, the above described misalignment is without adverse effect and the first spacer layer is entirely located on the second spacer layers. In this situation, the effective thickness of the spacer is established over the entire projected area of the first spacer layer on the substrate, Therefore, regardless of the position within the liquid crystal display apparatus panel or the production lot, gap uniformity between two substrates is achieved.

Figure 9A:
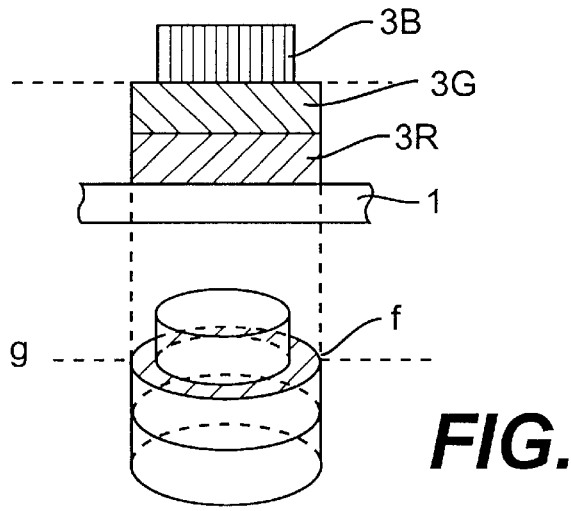
FIGS. 9(a) to 9(c) are sectional views and perspective views of a spacer of a color liquid crystal display apparatus according to another embodiment of the present invention.

For example, in FIG. 9(a), a spacer layer 3B is a first spacer layer. A plurality of spacer layers 3R and 3G are second spacer layers. Each spacer layer has a first surface on a substrate structure 1 side and a second surface opposite to the first surface. The first and second surfaces of each spacer layer are the same size. The spacer layers, 3R and 3G, are the same size and are larger than the spacer layer 3B. Each of the spacer layers, 3R and 3G, has a sectional plane which is substantially parallel to the substrate structure. For example this sectional plane is a plane containing the line "g". This sectional plane has the entire projected area of the first spacer layer 3B therein and elongated portion "f" extending beyond the projected area.

Figure 9B:
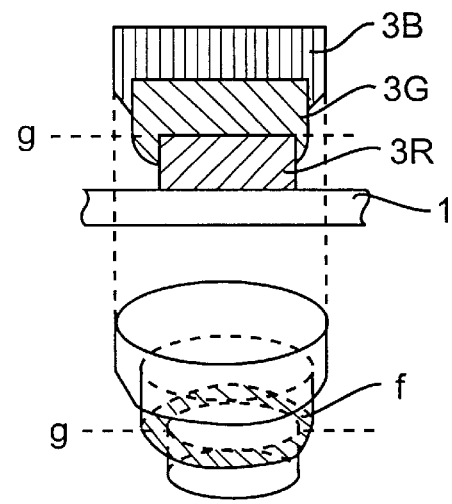

In FIG. 9(b), a spacer layer 3R is a first spacer layer and a plurality of spacer layers 3G and 3B are second spacer layers. With respect to the relative diameters in the stack of spacer layers, the size of the spacer layer is gradually increased. Each of the spacer layers, 3G and 3B, has a sectional plane which is substantially parallel to the substrate structure. For example this sectional plane is a plane containing the line "g". This sectional plane has the entire projected area of the first spacer layer 3R therein and a portion "f" extending beyond the projected area. The size of the spacer layer is gradually increased in the stack of spacer layers, so that an electrode (not shown) does not cover the entire spacer. As a result, a short-circuit between the electrode formed on the spacer on the first substrate and an electrode formed on the second substrate is prevented.

Figure 9C:
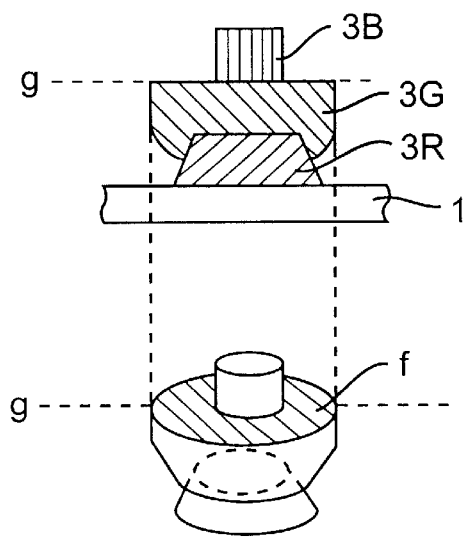

In FIG. 9(c), a spacer layer 3B is a first spacer layer. A plurality of spacer layers 3R and 3G are second spacer layers. Each spacer layer has a first surface on a substrate structure 1 side and a second surface opposite to the first surface. The first and second surfaces of the spacer layer 3B are the same size. With respect to diameter the size of the first surface of the spacer layer 3G is smaller than the size of the second surface of the spacer layer 3G. With respect to diameter the size of the first surface of the spacer layer 3R is larger than the size of the second surface of the spacer layer 3R. The spacer layer 3R has the trapezium shape shown in the sectional view. Each the spacer layers, 3G and 3R, has a sectional plane which is substantially parallel to the substrate structure. For example this sectional plane is a plane containing the line "g". This sectional plane has a entire projected area of the first spacer layer 3B therein and a portion "f" extends beyond the projected area. The size of the middle spacer layer 3G is larger than that of the lower spacer layer 3R and the upper spacer layer 3B, so that an electrode (not shown) does not cover the entire spacer. As a result, a short-circuit between the electrode formed on the spacer on the first substrate and an electrode formed on the second substrate is prevented.

Figure 10A:
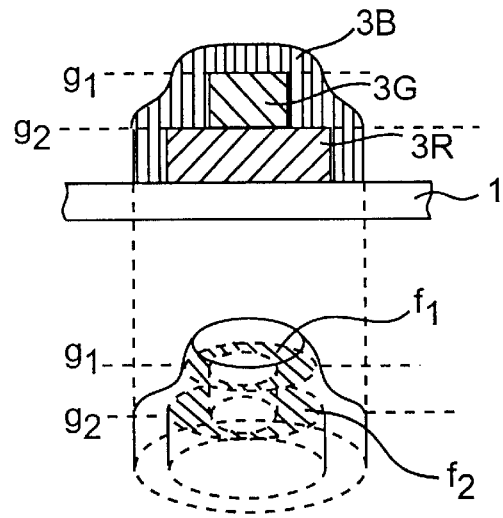
FIGS. 10(a) and 10(b) are sectional views and perspective views of a spacer of a color liquid crystal display apparatus according to another embodiment of the present invention.

In FIG. 10(a), a spacer layer 3G is a first spacer layer. A plurality of spacer layers 3R and 3B are second spacer layers. Each spacer layer has a first surface on a substrate structure 1 side and a second surface opposite to the first surface. The first surface and the second surface of the spacer layer 3G are the same size. The first and second surfaces of the spacer layer 3R are the same size. The spacer layers, 3R and 3G, are covered by the spacer layer 3B. Each the spacer layers, 3B and 3R, has a sectional plane which is substantially parallel to the substrate structure. For example these sectional plane are planes containing the lines "g1" and "g2". Each of these sectional planes has a entire projected area of the first spacer layer 3G therein and a portion "f1" and "f2" extends beyond the projected area.

Figure 10B:
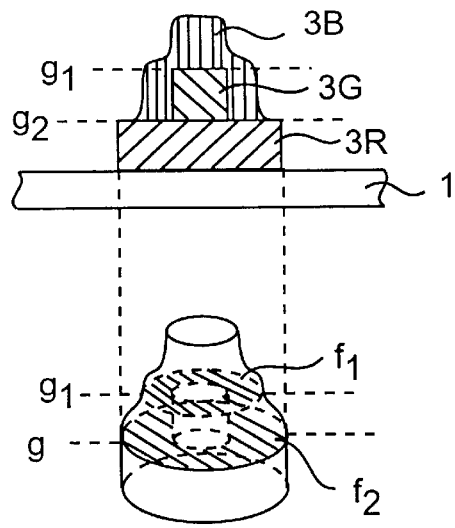

In FIG. 10(b), a spacer layer 3G is a first spacer layer. A plurality of spacer layers 3R and 3B are second spacer layers. The first and second surface of each spacer layer, 3R and 3G, are the same size. Only the spacer layer 3G is completely covered by the spacer layer 3B. Each of the spacer layers, 3B and 3R, has a sectional plane which is substantially parallel to the substrate structure. For example these sectional planes are planes containing the lines "g1" and "g2". Each of these sectional planes has a entire projected area of the first spacer layer 3G therein and a portion "f1" and "f2" extending beyond the projected area.

Figure 11A:
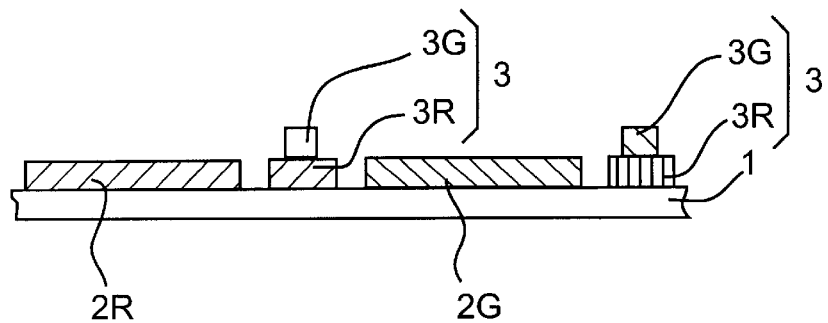
FIGS. 11(a) to 11(c) are sectional views of spacers and color ink layers of a color liquid crystal display apparatus according to another embodiment of the present invention.
Figure 11B:
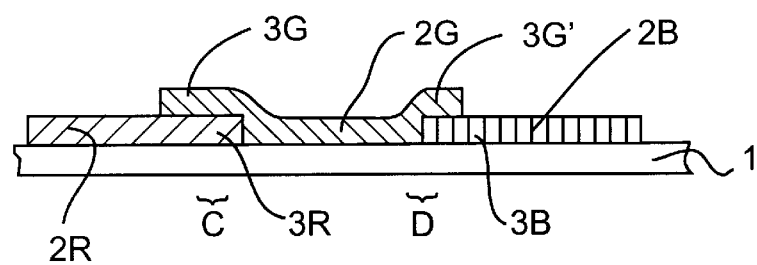

The above examples show spacers which include three stacked color spacer layers, however the spacer can include more than or less than three color spacer layers. When the spacer includes two spacer layers, it is preferable that the color layers 2 are positioned at a predetermined distance from the spacers 3, as shown in FIG. 11(a). Because, as shown in FIG. 11(b), when spacer layers 3G and 3G' are connected with a color layer 2G, a spacer layer 3R is connected with a color layer 2R and a spacer layer 3B is connected with a color layer 2B, the area of effective thickness of a spacer to maintain the gap between the two substrates is not uniform on the substrate structure 1. For example, the spacer C and the spacer D may be formed by misalignment during the formation process of the stacked spacer layers.

Figure 11C:
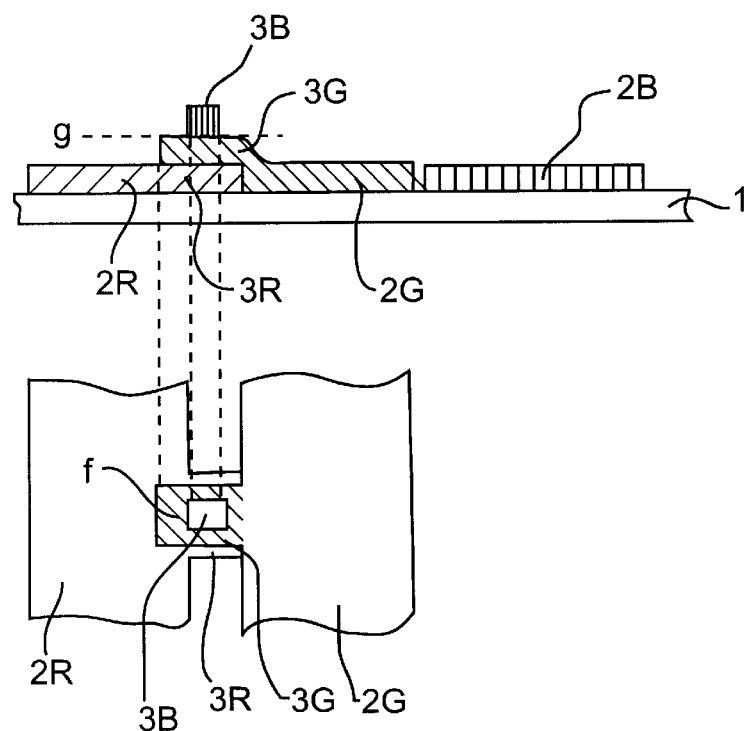

When a spacer includes more than three spacer layers, the spacer can include a spacer layer which is connected to the color layer. In such a case, the spacer must have at least one spacer layer which is disposed at a distance from the color layers. For example, in FIG. 11(c), the spacer has the spacer layers 3R, 3G and 3B. The spacer layer 3R is connected with a color layer 2R, the spacer layer 3G is connected with a color layer 2G and the spacer layer 3B is disposed at a distance from a color layer 2B. In this case, the spacer layer 3B is a first spacer layer. Each the spacer layers, 3G and 3R, has a sectional plane which is substantially parallel to the substrate structure. For example this sectional plane is a plane containing the line "g". This sectional plane has a entire projected area of the first spacer layer 3B therein and a portion "f" extending beyond the projected area.

Figure 12:
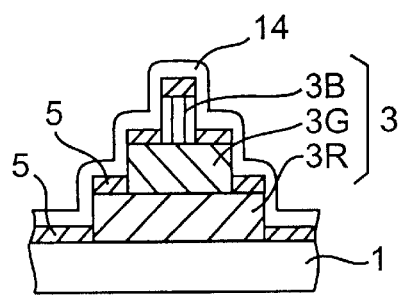
FIG. 12 is a sectional view of a spacer of a color liquid crystal display apparatus according to another embodiment of the present invention.

In FIG. 12, it is preferable that a insulating layer, for example the alignment layer 14, covers the spacer 3 and color layers (not shown). In case the insulating layer is not covering the spacer 3, the spacer 3 directly touches the liquid crystal materials. In this case, the liquid crystal layer is mixed with the organic material of the spacer layer, so that a defect in the display is caused. For preventing this problem, in FIG. 12, it is preferable that the insulateing layer, for instance the alignment layer 14, covers the spacer and the color layers. As a result, it is preventable that the organic material of the spacer layer mixes with the liquid crystal material.

In addition to this, it is preferable that the size of the spacer layer is gradually decreased in proportion to stacking the spacer layers. In this case, comparing to a spacer which includes spacer layers being gradually increased in proportion to stacking, the electrodes or the insulating layer are formed easily on the side of the spacer. As a result, the liquid crystal layer is further prevented from being mixed with the organic material of the spacer layer.

A further embodiment of the present invention will be described below.

In a previously described embodiment, the color layers are positioned at a distance from the spacers, that is, the spacers are formed in isolation from the color layers, and the spacer layers have an island shape. However the spacer and the color layers can be positioned as follows.

For example, in FIGS. 11(a)–11(c), and 15(a)–15(c), the spacer can include a spacer layer which is connected to the color layer. In this case, the spacer must have at least one spacer layer which is disposed at a distance from the color layers.

Figure 15A:
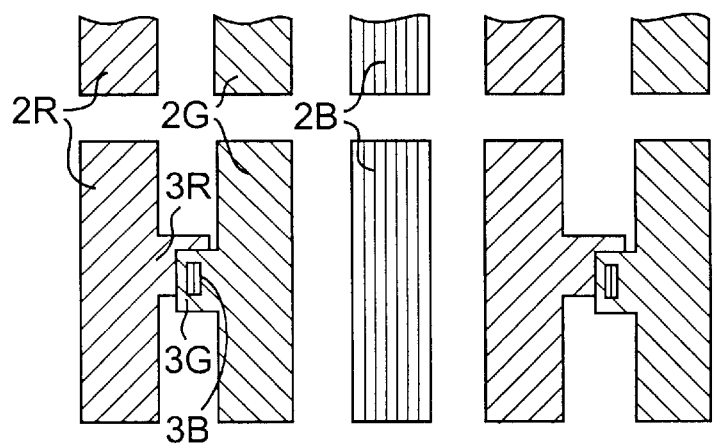
FIGS. 15(a) to 15(c) are plan views of spacers and color layers of a color liquid crystal display apparatus according to another embodiment of the present invention.
Figure 15B:
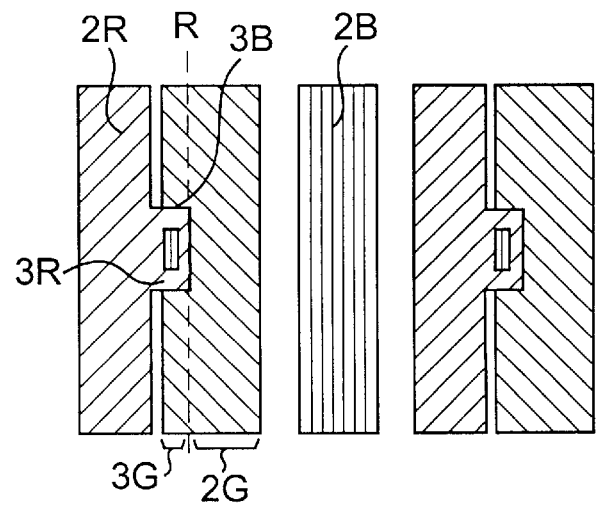
Figure 15C:
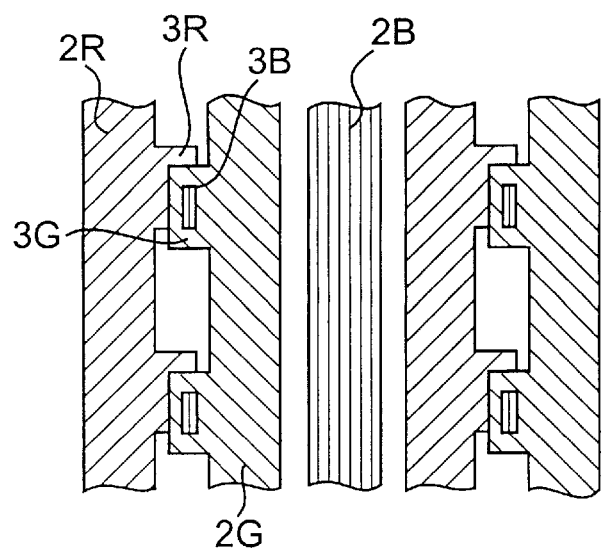

In FIGS. 15(a), 15(b) and 15(c), a spacer layer 3R is connected with a color layer 2R, a spacer layer 3G is connected with a color layer 2G, and a spacer layer 3B is disposed at a distance from a color layer 2B. The spacer layer 3B is a first spacer layer. The spacer layers, 3R and 3G, are a plurality of second spacer layers. In FIGS. 15(b) and 15(c), the color layer has a stripe shape and in FIG. 15(a), a shape of the color layers corresponds to the pixel electrode.

Figure 13:
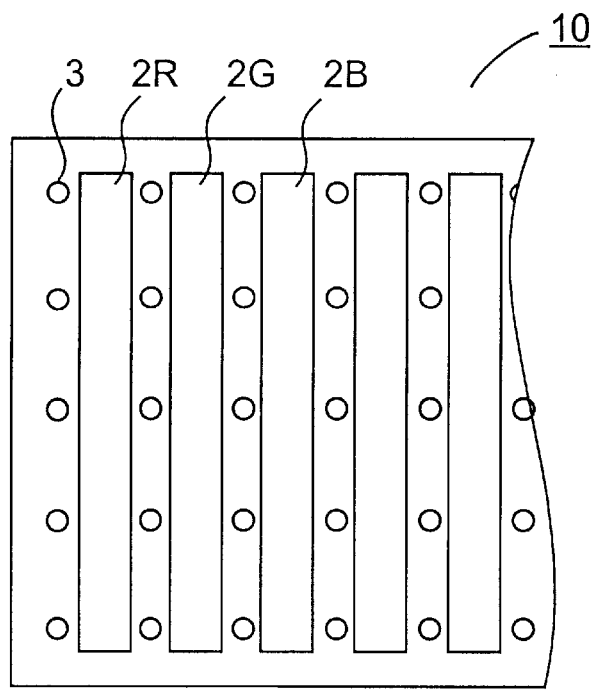
FIG. 13 is a plan view of spacers and color ink layers of a color liquid crystal display apparatus according to another embodiment of the present invention.
Figure 14:
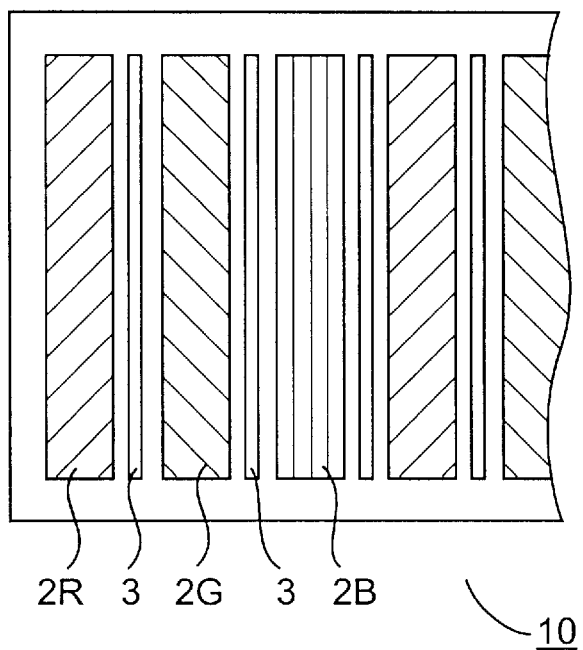
FIG. 14 is a plan view of spacers and color ink layers of a color liquid crystal display apparatus according to another embodiment of the present invention.

In FIGS. 13 and 14, a plurality of color layers, 2R, 2G and 2B, have a stripe shape, and the color layers 2 are disposed at a predetermined distance from a plurality of spacers 3. In FIG. 13, the spacers have an island shape and in FIG. 14, the spacers have a stripe shape.

A further embodiment of the present invention will be described below.

Figure 16:
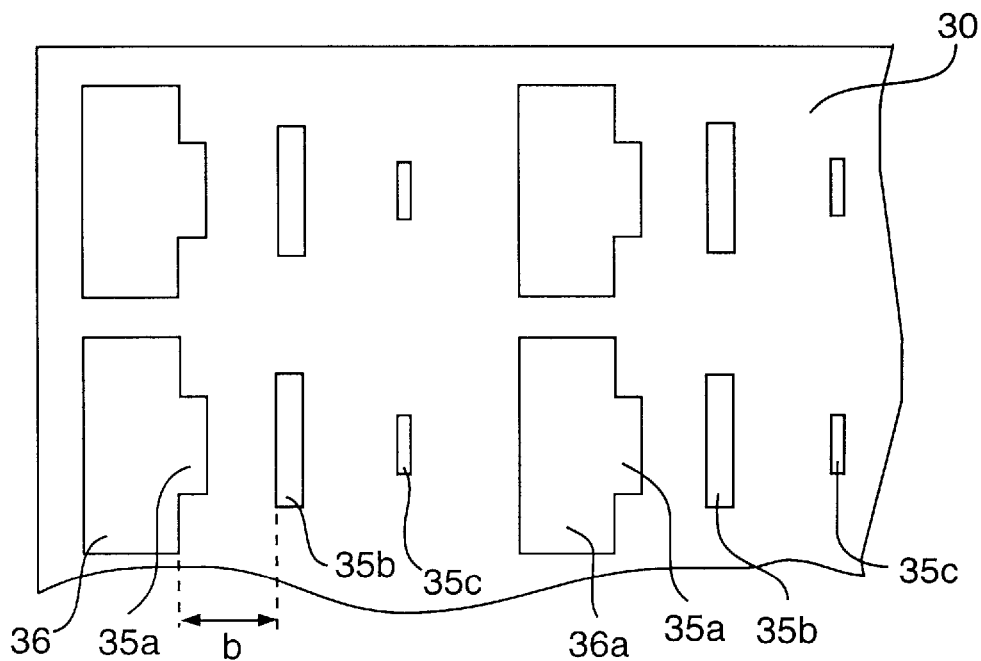
FIG. 16 is a plan view of a photomask for forming a color filter substrate of a color liquid crystal display apparatus according to another embodiment of the present invention.

In a previously described embodiment, three kind of photomask are used. However, by using a photomask 30 such shown in FIG. 16, only one kind of the photomask is required. The photomask 30 has a plurality of holes 36 for the color layers and a plurality of holes for the spacer layers. The holes for the spacer layers 35 have three sizes, 35a, 35b and 35c. When it is desired to construct the spacer which includes three spacer layers and the color layers, the photomask 30 is transferred the distance b upon forming each spacer layer. As a result, the spacer includes three stacked spacer layers which are formed by the holes 35a, 35b and 35c, respectively.

A further embodiment of the present invention will be described below.

Figure 17:
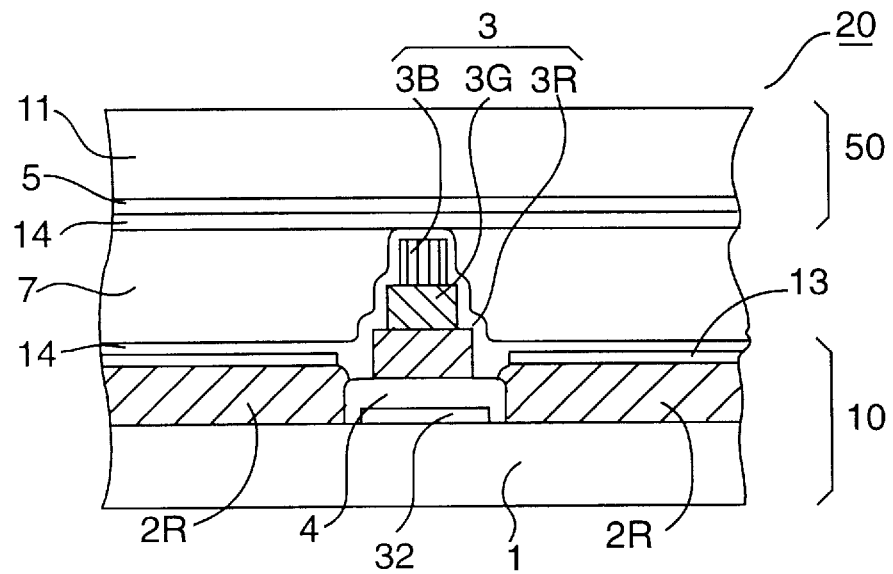
FIG. 17 is a sectional view of a color liquid crystal display apparatus according to another embodiment of the present invention.
Figure 18:
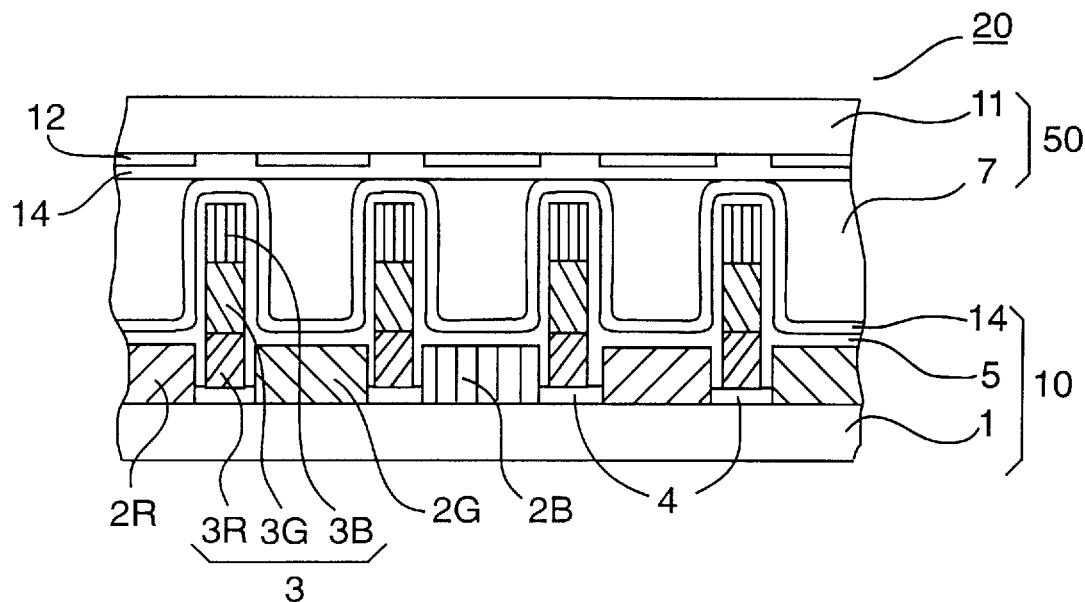
FIG. 18 is a sectional view of a color liquid crystal display apparatus according to the prior art.
Figure 19:
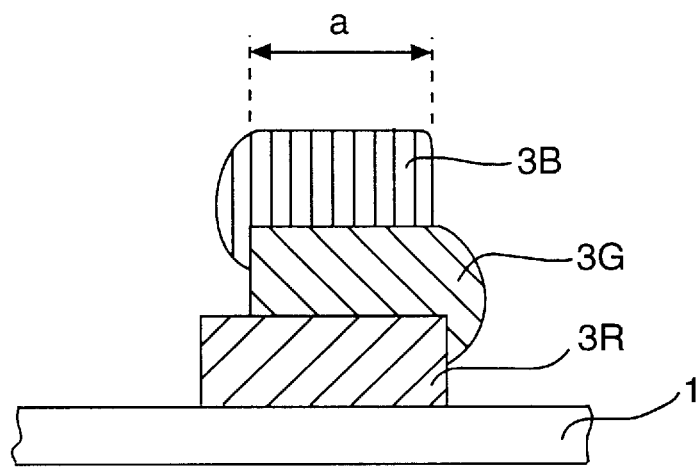
FIG. 19 is a sectional view of a spacer of a color liquid crystal display apparatus according to the prior art.

In FIG. 17, the color liquid crystal display apparatus 20 has the color filter substrate 10, the opposite electrode substrate 50 and the liquid crystal layer 7 disposed between the two substrates. A plurality of color layers, a plurality of spacer, gate lines, signal lines and transistors can be formed on the same substrate structure. The color filter substrate 10 has a first substrate structure 1, a plurality of gate lines 32 disposed on the first substrate structure 1, a plurality of signal lines (not shown) formed so as to cross the gate lines 32, a plurality of transistors (not shown) coupled with the gate lines 32 and the signal lines (not shown), the opaque layer 4 on the gate lines, a plurality of color layers 2 formed on the first substrate structure 1, a plurality of spacers 3, a plurality of pixel electrodes 13 coupled with the transistors, a plurality of storage capacitor lines(not shown) coupled with the pixel electrodes 13, and an alignment layer 14, all formed on the first substrate structure 1. The spacer 3 includes spacer layers 3R, 3G and 3B stacked on the opaque layer 4. On the other hand, the opposite electrode substrate 50 has a second substrate structure 11, an electrode 5 formed on the second substrate structure 11, and then the alignment layer 14 formed thereon.

Additional advantages and modification will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. A color filter substrate comprising:
    a substrate structure;
    a plurality of color layers disposed on said substrate structure; and
    a plurality of spacers, each of said spacers including a first spacer layer and a plurality of second spacer layers, said first and second spacer layers being stacked, and one of said first and second spacer layers disposed on said substrate structure,
    wherein each of said first and second spacer layers has a first surface on a substrate structure side and a second surface opposite to said first surface, for at least one of said first or second spacer layers said second surface is equal to or smaller in size than said first surface, each of said second spacer layers has a sectional plane which is substantially parallel to said substrate structure, and said sectional plane has an entire projective area of said first spacer layer therein and an elongated portion from said projective area.

2. A color filter substrate according to claim 1, wherein said first spacer layer and plurality of spacer layers are formed during a formation process of said plurality of color layers.

3. A color filter substrate according to claim 1, wherein each said color layer is positioned in an effective pixel area and said spacers are disposed between neighboring ones of said effective pixel areas.

4. A color filter substrate according to claim 1, wherein each said color layer is positioned in an effective pixel area, said color filter substrate further including an opaque layer between neighboring one of said effective pixel areas, said spacers being positioned within an area of a surface of said opaque layer.

5. A color filter substrate according to claim 1, wherein said color layers are positioned at a predetermined distance from said spacers.

6. A color filter substrate according to claim 1, wherein said color layers are disposed at a predetermined distance from said spacers and said spacers have an island shape.

7. A color filter substrate according to claim 1, wherein said spacer layers which are formed by a first process are connected with said color layers formed by said first process.

8. A color filter substrate comprising;
a substrate structure;
a plurality of color layers disposed on said substrate structure; and
a plurality of spacers, each of said spacers including a first spacer layer and a second spacer layer, said first and second spacer layers being stacked and one of said first and second spacer layers disposed on said substrate structure,
wherein said color layers are positioned at a predetermined distance from said spacers, each of said first and second spacer layers has a first surface on a substrate structure side and a second surface opposite to said first surface, said second spacer layer has a sectional plane which is substantially parallel to said substrate structure; and said sectional plane has a entire projective area of said-first spacer layer therein and an elongated portion from said projective area.

9. A color filter substrate according to claim 8, wherein said first spacer layer and said second spacer layer are formed during a formation process of said color layers.

10. A color filter substrate according to claim 8, wherein each said color layer is positioned in an effective pixel area and said spacers are disposed between neighboring ones of said effective pixel areas.

11. A color filter substrate according to claim 8, further comprising an effective pixel area and an opaque layer disposed between neighboring ones of effective pixel areas corresponding to each said color layer, said spacers being aligned within an area of said opaque layer.

12. A color filter substrate according to claim 1 or 8, further comprising an insulating layer covering said spacers.

13. A color filter substrate according to claim 1 or 8, wherein a size of a smaller of said first and second surfaces of each spacer layer gradually decreases in the stack of spacer layers.

14. A color filter substrate according to claim 1 or 8, wherein said first spacer layer is positioned at the most distant from said substrate structure.

15. A liquid crystal display apparatus comprising:
a first substrate structure having a first electrode;
a second substrate structure having a second electrode;
a liquid crystal layer disposed between said first substrate structure and said second substrate structure;
a plurality of color layers disposed on a selected one of said first and second substrate structures; and
a plurality of spacers, each of said spacers including a first spacer layer and a plurality of second spacer layers, said first and second spacer layers being stacked, and one of said first and second spacer layers disposed on said selected substrate structure,
wherein said color layers are positioned at a predetermined distance from said spacers, each of said first and second spacer layers has a first surface on a substrate structure side and a second surface opposite to said first surface, for at least one of said first or second spacer layers said second surface is equal to or smaller in size than said first surface, each of said second spacer layers has a sectional plane which is substantially parallel to said substrate structure, and said sectional plane has an entire projective area of said first spacer layer therein and an elongated portion from said projective area.

16. A liquid crystal display apparatus according to claim 15, wherein said first electrode includes a plurality of gate lines, said plurality of spacers are disposed on said second substrate structure and the most distant spacer layer from said second substrate structure is positioned at said gate lines.

17. A liquid crystal display apparatus comprising:
a first substrate structure having a first electrode;
a second substrate structure having a second electrode;
a liquid crystal layer disposed between said first substrate structure and said second substrate structure;
a plurality of color layers disposed on a selected one of said first and second substrate structures; and
a plurality of spacers, each of said spacers including a first spacer layer and a second spacer layer, said first and second spacer layers being stacked and one of said first and second spacer layers disposed on said selected substrate structure,
wherein each of said first and second spacer layers has a first surface on a substrate structure side and a second surface opposite to said first surface, said second spacer layer has a sectional plane which is substantially parallel to said substrate structure, and said sectional plane has a entire projective area of said first spacer layer therein and an elongated portion from said projective area.

18. A liquid crystal display apparatus comprising:
a first substrate structure;
a plurality of gate lines disposed on said first substrate structure;
a plurality of signal lines disposed so as to cross said gate lines;
a plurality of transistors coupled between said gate lines and said signal lines;
a plurality of pixel electrodes coupled with said transistors;
a plurality of storage capacitor lines coupled with said pixel electrodes;
a second substrate structure;
a plurality of color layers disposed on said second substrate structure, each said color layer positioned in correspondence with a different one of said pixel electrodes;
a plurality of spacers, each of said spacers including a first spacer layer and a plurality of second spacer layers, said first and second spacer layer being stacked, and one of said first and second spacer layers disposed on said second substrate structure; and
a liquid crystal layer disposed between said first substrate structure and said second substrate structure,
wherein each of said first and second spacer layers has a first surface on a substrate structure side and a second surface opposite to said first surface, for at least one of said first or second spacer layers said second surface is equal to or smaller in size than said first surface, each of said second spacer layers has a sectional plane which is substantially parallel to said substrate structure, said sectional plane has an entire projective area of said first spacer layer therein and an elongated portion from said projective area, and the most distant spacer layer from said second substrate structure is positioned at the electrode lines nearest said first substrate structure selected from said gate lines, said signal lines and said storage capacitor lines.

19. A liquid crystal display apparatus comprising:

a first substrate structure;

a plurality of gate lines disposed on said first substrate structure;

a plurality of signal lines disposed so as to cross said gate lines;

a plurality of transistors coupled between said gate lines and said signal lines;

a plurality of pixel electrodes coupled with said transistors;

a plurality of storage capacitor lines coupled with said pixel electrodes;

a second substrate structure;

a plurality of color layers disposed on said second substrate structure, each said color layer positioned in correspondence with a different one of said pixel electrodes;

a plurality of spacers, each of said spacers including a first spacer layer and a second spacer layer, said first and second spacer layers being stacked, and one of said first and second spacer layers disposed on said second substrate structure; and a liquid crystal layer disposed between said first substrate and said second substrate, wherein said color layers are positioned at a predetermined distance from said spacers, each of said first and second spacer layers has a first surface on a substrate structure side and a second surface opposite to said first surface, said second spacer layer has a sectional plane which is substantially parallel to said substrate structure, said sectional plane has an entire projective area of said first spacer layer therein and an elongated portion from the projective area, and the most distant spacer layer from said second substrate structure is positioned at electrode lines nearest from said first substrate structure selected from said gate lines, said signal lines and said storage capacitor lines.

* * * * *

UNITED STATES PATENT AND TRADEMARK OFFICE
CERTIFICATE OF CORRECTION

PATENT NO. : 5,815,232
DATED : September 29, 1998
INVENTOR(S) : Daisuke MIYAZAKI et al.

It is certified that error appears in the above-indentified patent and that said Letters Patent is hereby corrected as shown below:

On the Title Page, Item [57], in the Abstract, line 5, "a entire" should read --an entire--; and line 22, "substrate," should read --substrate.--.

Claim 8, Col. 13, line 16, "comprising;" should read --comprising:--.

Claim 8, Col. 13, lines 30-31, "structure;" should read --structure,--.

Claim 8, Col. 13, line 31, "a entire" should read --an entire--.

Claim 8, Col. 13, line 32, "said-first" should read --said first--.

Claim 17, Col. 14, line 36, "a entire" should read --an entire--.

Signed and Sealed this

Thirteenth Day of July, 1999

Attest:

Attesting Officer

Q. TODD DICKINSON

Acting Commissioner of Patents and Trademarks